United States Patent [19]
Yeh

[11] Patent Number: 5,588,567
[45] Date of Patent: Dec. 31, 1996

[54] HANDLE ARRANGEMENT FOR TEA KETTLES

[76] Inventor: Kuo-Strai Yeh, No. 15, Lane 33, Wei Kuo St., Tainan City, 701, Taiwan

[21] Appl. No.: 562,397

[22] Filed: Nov. 24, 1995

[51] Int. Cl.$^6$ .................................................. A47G 19/14
[52] U.S. Cl. .................... 222/475.1; 16/114 A; 220/768; 222/473
[58] Field of Search .................. 222/465.1, 472–475.1; 16/110.5, 114 A; 215/396; 220/756, 759, 768, 769

[56] References Cited

U.S. PATENT DOCUMENTS

| | | | |
|---|---|---|---|
| 2,590,596 | 3/1952 | Ziskin et al. | 222/473 |
| 2,638,253 | 5/1953 | Mueller | 222/472 |
| 2,666,556 | 1/1954 | Ziskin et al. | 222/473 |
| 2,670,107 | 2/1954 | Welden | 222/474 |
| 2,696,332 | 12/1954 | Felver | 222/473 |
| 3,591,060 | 7/1971 | Nakamura et al. | 222/475 |
| 3,632,025 | 1/1972 | Bloomfield | 222/472 |

*Primary Examiner*—Kevin P. Shaver
*Attorney, Agent, or Firm*—Charles E. Baxley, Esq.

[57] ABSTRACT

A tea kettle includes a tea kettle body having a spout, a handle base removably mounted to the tea kettle body and having a bore for receiving the spout and an engaging block, and a handle removably mounted to the handle base and including a hollow member formed at a lower end thereof, the hollow member having an engaging slot defined therein for releasably receiving the engaging block of the handle base.

2 Claims, 4 Drawing Sheets

HANDLE ARRANGEMENT FOR TEA KETTLES

BACKGROUND OF THE INVENTION

1. Field of the Invention

The present invention relates to an improved handle arrangement for tea kettles and, more particularly, to a handle arrangement which is detachable from a tea kettle body to reduce a volume thereof for saving transportation cost.

2. Description of Related Art

Tea kettles are a daily utensil, and a typical one, designated by reference numeral "3'" and shown in FIG. 5 of the drawings, includes a tea kettle body 1' having a spout 11' and an integrally formed handle 2'. A whistle means 4' is mounted to the handle 2' and includes a pair of ears in which holes 41' are defined to engage with a pair of protrusions 21' formed on both sides of the handle 2'. Transportation plays an important role in business and the volume of the object to be transported is the most decisive factor to the transportation cost. It is, however, found that the volume of the tea kettle during transportation is still bulky, and, therefore, there has been a long and unfulfilled need for an improved tea kettle structure to reduce the volume thereof, thereby lowering the transportation cost.

SUMMARY OF THE INVENTION

It is a primary object of the present invention to provide a tea kettle having a handle arrangement which is detachably mounted to a tea kettle body thereof to reduce the volume for transportation, thereby saving the transportation cost.

In accordance with the present invention, a tea kettle generally includes a tea kettle body having a spout, a handle base removably mounted to the tea kettle body and having a bore for receiving the spout and an engaging block, and a handle removably mounted to the handle base and including a hollow member formed at a lower end thereof, the hollow member having an engaging slot defined therein for releasably receiving the engaging block of the handle base.

In accordance with one aspect of the present invention, the engaging block .of the handle base includes at least one protrusion formed thereon, and the hollow member includes a corresponding number of hole defined therein for releasably receiving the protrusion.

Other objects, advantages, and novel features of the invention will become more apparent from the following detailed description when taken in conjunction with the accompanying drawings.

DESCRIPTION OF THE PREFERRED EMBODIMENT

Figure 1:
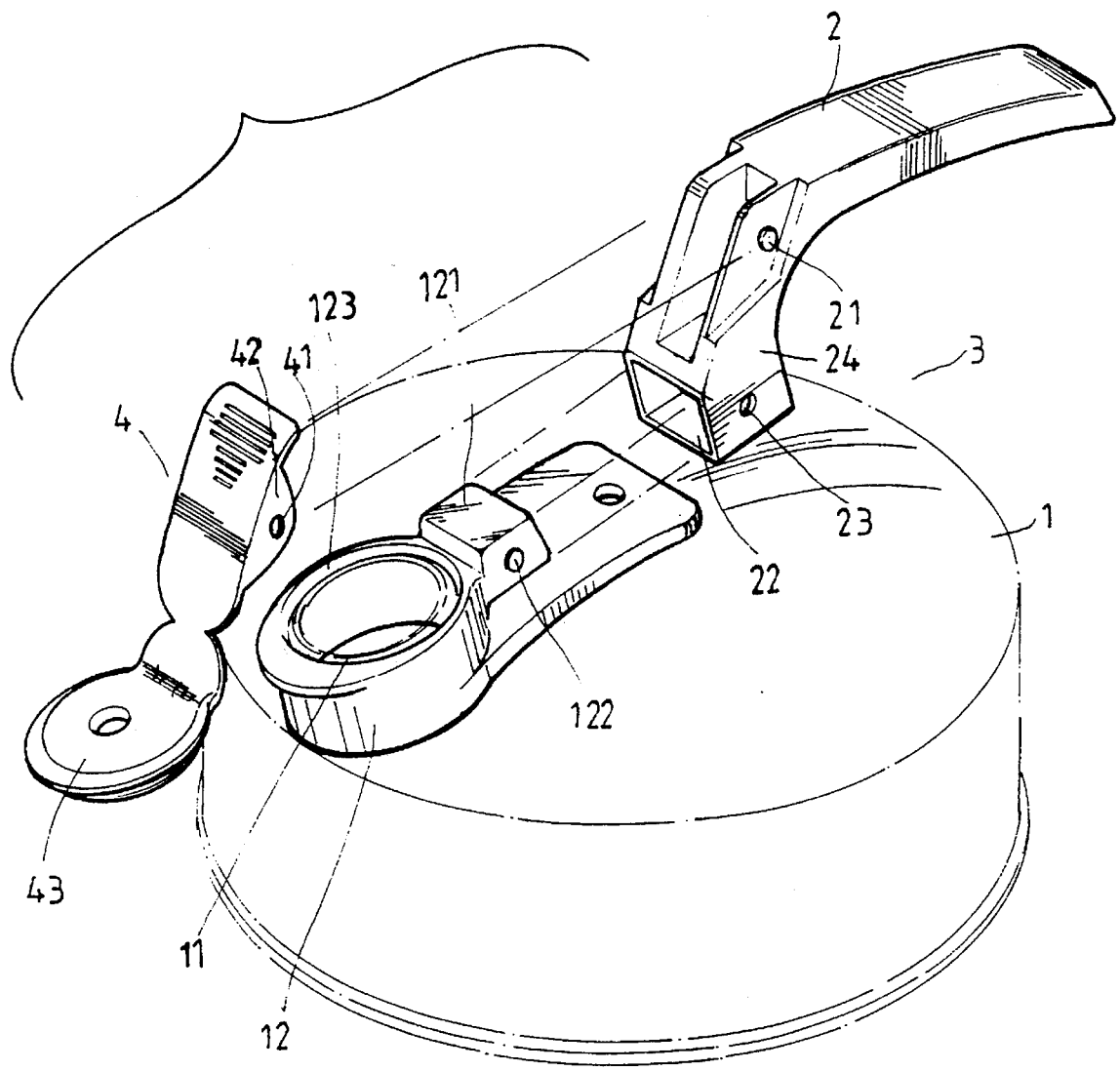
FIG. 1 is a perspective view, partly exploded, of a tea kettle in accordance with the present invention.
Figure 2:
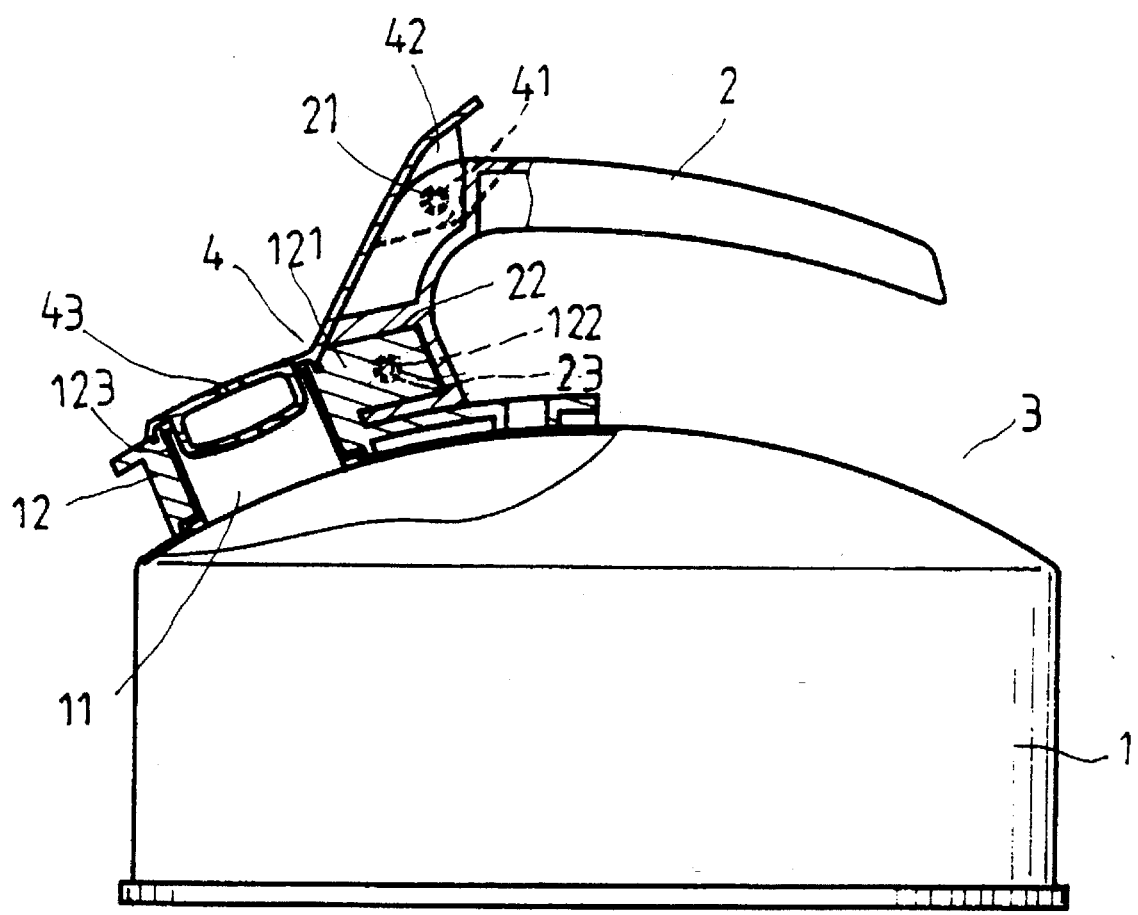
FIG. 2 is a side elevational view, partly sectioned, of the tea kettle in accordance with the present invention.

Referring to FIGS. 1 and 2, a tea kettle in accordance with the present invention is designated by reference numeral "3" and generally includes a tea kettle body 1, a handle base 12, a handle 2, and a whistle means 4. The tea kettle body 1 is a hollow container and includes a spout 11 thereon. The handle base 12 is substantially arcuate and removably mounted to the tea kettle body 2 and includes an underside which is fittingly mounted to an upper side of the tea kettle body 1 and a sleeve portion having a bore 123 defined therein for receiving the spout 11.

The handle base 12 further includes an engaging block 121 projecting therefrom and having a pair of protrusions 122 (only one protrusion is shown) formed on both sides thereof. The handle 2 is substantially arcuate and includes a hollow member 24 which is formed at a lower end thereof and has an engaging slot 22 for fittingly engaging with the engaging block 121 and a pair of holes 23 respectively defined in two lateral sides thereof which define the engaging slot 22, the holes 23 releasably receiving with the protrusions 122.

The handle 2 further includes a pair of second protrusions 21 defined thereon, the purpose of which will be described hereinafter. The whistle means 4 is optionally removably mounted to the handle 2 and includes a whistle 43 and a pair of ears 42 in each of which a hole 41 is defined to receive with the protrusions 21 defined on the handle 2.

In assembly, the handle base 12 is mounted to the tea kettle body 1 with the spout 11 received in the bore 123 of the handle base 12. Then, the handle 2 is mounted to the handle base 12 by means of engagement between the engaging block 121 and the engaging slot 22 as well as the engagement between the protrusions 122 and the holes 23. Finally, the whistle means 4 is mounted to the handle 2 by means of engagement between the holes 41 and the protrusions 21 on the handles 2.

Figure 4:
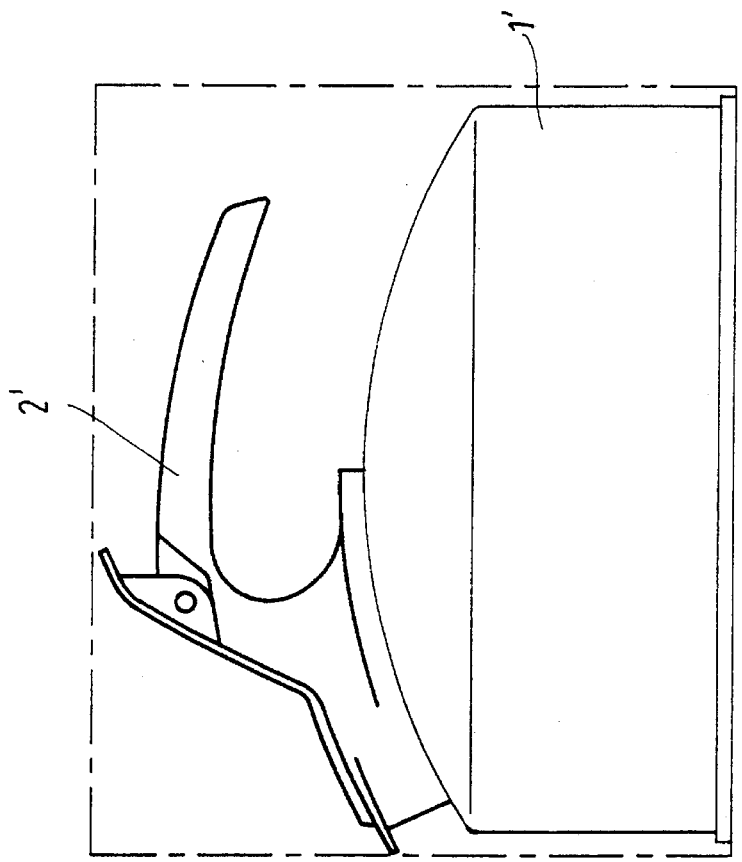
FIG. 4 is a schematic side view illustrating a transportation volume of a tea kettle according to prior art.
Figure 3:
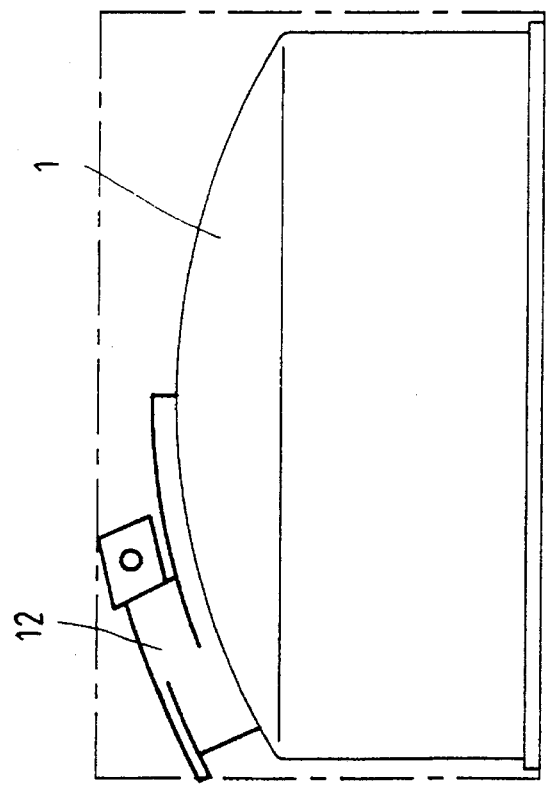
FIG. 3 is a schematic side view illustrating a transportation volume of the tea kettle in accordance with the present invention.
Figure 5:
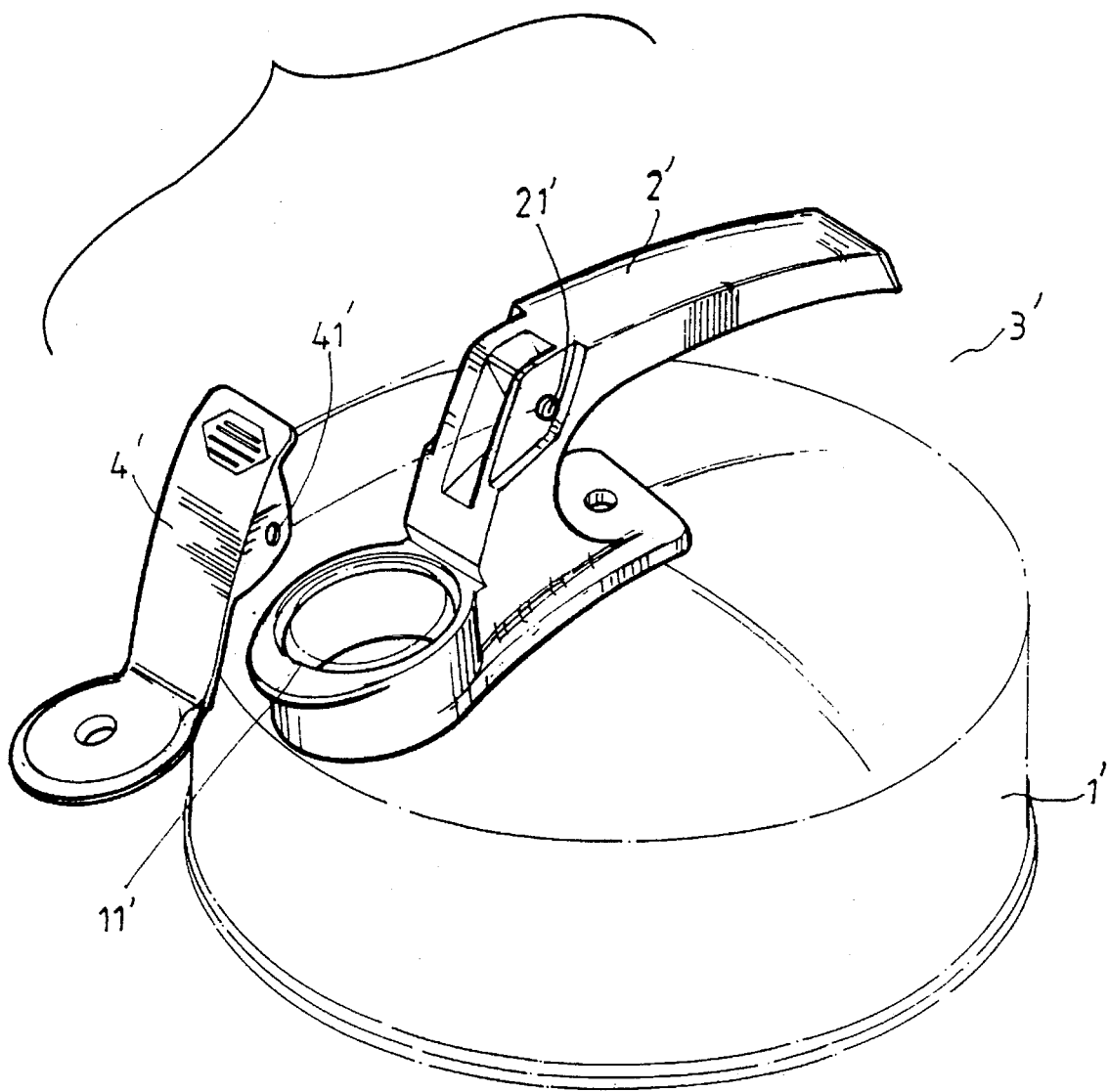
FIG. 5 is a perspective view, partly exploded, of a tea kettle according to prior art.

Referring now to FIGS. 3 and 4, it is clearly seen that, during transportation, the tea kettle of the present invention occupies a space less than that required for a conventional one by a considerable amount and thus saves considerable transportation costs.

Although the invention has been explained in relation to its preferred embodiment, it is to be understood that many other possible modifications and variations can be made without departing from the spirit and scope of the invention as hereinafter claimed.

What is claimed is:

1. A tea kettle comprising:

a tea kettle body having a spout;

a handle base removably mounted to the tea kettle body and having a bore for receiving the spout and an engaging block; and a handle removably mounted to the handle base and including a hollow member formed at a lower end thereof, the hollow member having an engaging slot defined therein for releasably receiving the engaging block of the handle base.

2. The tea kettle as claimed in claim 1, wherein the engaging block of the handle base includes at least one protrusion formed thereon, and the hollow member includes a corresponding number of hole defined therein for releasably receiving the protrusion.

* * * * *